2,838,482
Patented June 10, 1958

2,838,482

PROCESS OF SULFONATING CASEIN, ZEIN, OR SOY-BEAN PROTEIN

Meyer Mendelsohn, New York, N. Y., assignor to Ions Exchange and Chemical Corp., New York, N. Y., a corporation of New York No Drawing. Application April 15, 1953
Serial No. 349,091

1 Claim. (Cl. 260—119)

My present invention relates to ion exchangers adapted to be used as detergents, wetting agents, emulsifiers and the like and further adapted to be incorporated in separators for electric batteries, according to the teachings of my co-pending application Ser. No. 251,780, filed October 17, 1951, as well as to separators incorporating such ion exchangers.

This application is a continuation-in-part of my co-pending application Ser. No. 285,787, filed May 2, 1952, now abandoned.

The general object of my present invention is to provide novel processes for the production of improved ion exchange materials and/or separators of the character set forth above.

A more specific object of this invention is to provide novel separator materials for alkaline cells, e. g. of the silver-and-zinc type, adapted to withstand harmful penetration by metal ions.

An ion exchanger produced in accordance with the present invention is obtained by sulfonating a water-insoluble, sulfonable high-polymer starting material in the presence of silver oxide as a catalyst. The amount of catalyst may range from about 1% to about 10%, by weight, of the sulfonable solids, a proportion of 5% having been found very satisfactory. By "sulfonable," as used hereinabove and in the appended claims, is meant the property of having one or more available hydrogen atoms. The treatment according to this invention consists of reacting the above mentioned material with concentrated sulfuric acid and/or its anhydride ($SO_3$).

The treatment just described, if carried to completion, results in a water-soluble material having ion exchange properties. The final product is precipitated with an alkali from its solution and may be filtered out and thereafter dried at room temperature if no particular degree of purity is required. In other instances, e. g. if the material is to be incorporated in a battery separator, the ion exchange precipitate is preferably separated from the inorganic admixtures by dialysis through a suitable membrane, such as cellophane, and thereafter dried by evaporation of the liquid.

Following are several examples of a process for producing an ion exchanger in accordance with my invention.

*Example I*

20 g. of lactic casein (e. g. the Argentine variety) are suspended in 100 g. of 96% sulfuric acid. 1 g. of silver oxide powder $Ag_2O$ is stirred into the bath, thereby initiating a reaction resulting in the dissolution of the casein after four days' standing at room temperature. The solution is then diluted with 500 g. of water; adding 56 g. of potassium hydroxide thereupon precipitates the organic ion exchange material which can be isolated in the manner set forth above.

*Example II*

The procedure of the foregoing example is modified by dissolving 100 grams of lactic casein in 100 g. of 96% sulfuric acid, increasing the amount of silver oxide to 5 g. and storing for two hours at 80° C., thereafter for four days at room temperature. The remaining steps are the same as above.

*Example III*

50 g. of zein are dissolved in 100 g. of concentrated sulfuric acid (as above) in the presence of 2½ g. of silver oxide; the solution is stored for two hours at 80° C., thereafter for four days at room temperature. Subsequent treatment is the same as in the preceding examples.

(Other proteins related to casein and zein, such as soy bean protein, may be treated in the manner set forth in the preceding instances.)

*Example IV*

20 g. of regenerated cellulose (cellophane) are immersed in 100 g. of concentrated sulfuric acid in the presence of 1 g. of silver oxide; the product is stored for two days at room temperature. Other steps as above.

*Example V*

The same as Example IV, except that the quantity of cellophane is 30 g. per 100 g. of $H_2SO_4$, the quantity of silver oxide is 1½ g. and the storage takes place at $-10°$ C. for a period of 12 hours.

*Example VI*

20 g. of alpha cellulose are suspended in 100 g. of concentrated sulfuric acid together with 1 g. of silver oxide; the product is stored at room temperature for two days, then treated as in the preceding instances.

*Example VII*

20 g. of polystyrene resin powder are treated in the manner described for cellophane in Example IV, except that the storage is extended over four days.

I shall now describe the production of battery separators incorporating ion exchange materials in accordance with the invention.

*Example VIII*

75 g. of sulfonated water-soluble polystyrene, obtained in accordance with Example VIII, are dissolved in 150 g. of water at 50° C.; after cooling to room temperature, 75 g. of an aqueous emulsion of polystyrene-butadiene copolymer (50% solids) are added to the solution. Thorough mixing of the resulting fluid yields a film-forming substance adapted to leave a penetration-resistant coating on a sheet of cellophane dipped into it.

*Example IX*

75 g. of sulfonated polystyrene beads, of substantially water-insoluble character, are mixed with 75 g. of water and 5 cc. of 50% KOH. The mixture is placed in a pebble mill and ground to a particle size of approximately 10 to 20 microns. 150 grams of the so treated mixture are admixed with 75 g. of an aqueous emulsion of polystyrene (50% solids) plasticized with 30% dibutyl phthalate (by weight on a dry basis). Thorough mixing of the resulting fluid yields a film-forming substance as in the preceding example.

It should be noted that the emulsions described in Examples VIII and IX may be interchanged. The water-insoluble, sulfonated polystyrene may be obtained from the process of Example VII by foreshortening the treatment time and/or omitting the catalyst (silver oxide).

The separators obtainable with the processes of the two foregoing examples are particularly resistant to penetration by silver ions. A separator specifically adapted to withstand penetration by zinc ions may be produced as follows:

A suitable protein, such as casein, zein or soy bean, is solubilized by immersing 12 grams thereof in 100 grams of an alkaline zincate solution, such as a substantially saturated potassium zincate solution obtained from 40% KOH. 350 cc. of the zincate solution is admixed with 250 cc. of an emulsion as given in Example VIII along with 150 cc. of water. Cellophane is treated with the thoroughly stirred mixture as described in Examples VIII and IX.

I claim:

A process for producing an ion exchanger soluble in water and insoluble in alkaline solution which comprises the steps of sulfonating a high-molecular-weight polymer selected from the group which consists of casein, zein, and soy-bean protein by immersing said polymer in concentrated sulfuric acid, incorporating silver-oxide powder in said acid in a proportion ranging between substantially 1% and 10% by weight of said polymer, and maintaining said polymer immersed in said acid for a prolonged period.

References Cited in the file of this patent

UNITED STATES PATENTS

| | | |
|---|---|---|
| 2,137,927 | Sturm et al. | Nov. 22, 1938 |
| 2,344,267 | Reitz | Mar. 14, 1944 |
| 2,534,336 | Cahoon | Dec. 19, 1950 |
| 2,604,456 | Signer | July 22, 1952 |
| 2,636,851 | Juda et al. | Apr. 28, 1953 |

FOREIGN PATENTS

| | | |
|---|---|---|
| 659,484 | Germany | May 5, 1938 |

OTHER REFERENCES

Reitz et al.: J. Am. Chem. Soc., vol. 68, pages 1024–31 (1946).

Pepper: J. Applied Chemistry, vol. 1, March 1951, pages 124, 126, 127 and 131.